No. 758,113. PATENTED APR. 26, 1904.
W. SECK.
FRICTION GEAR FOR MOTOR CARS.
APPLICATION FILED APR. 23, 1903.
NO MODEL.
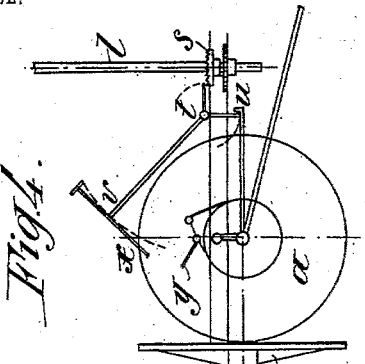
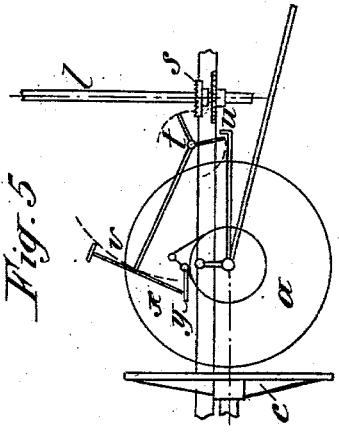
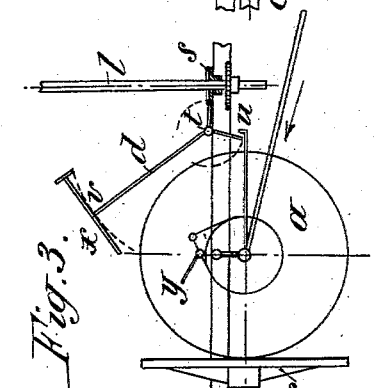
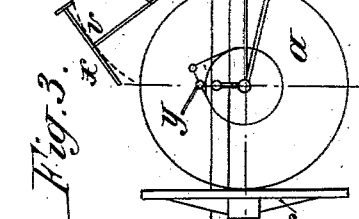
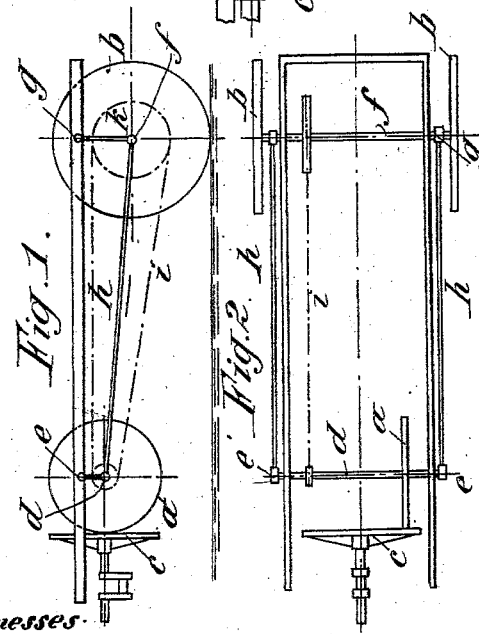
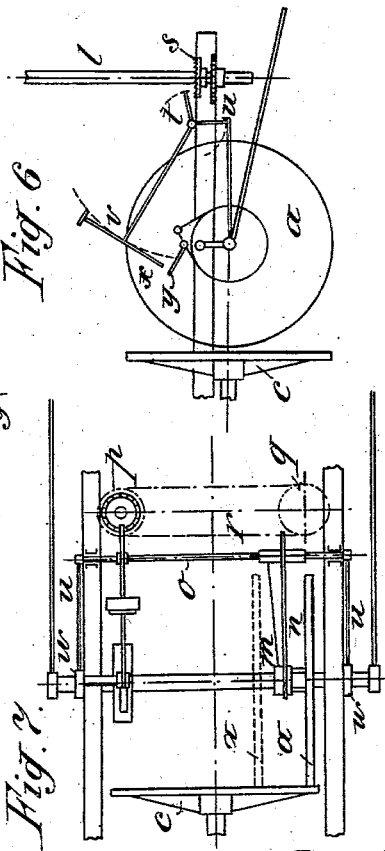
Witnesses
L. Waldenau
E. Heymann
Inventor:
Willy Seck
per B. Singer
Attorney No. 758,113. Patented April 26, 1904.

UNITED STATES PATENT OFFICE.

WILLY SECK, OF AIX-LA-CHAPELLE, GERMANY, ASSIGNOR TO EMIL BERGMANN, OF SUHL, THURINGIA, GERMANY.

FRICTION-GEAR FOR MOTOR-CARS.

SPECIFICATION forming part of Letters Patent No. 758,113, dated April 26, 1904.

Application filed April 23, 1903. Serial No. 153,971. (No model.)

*To all whom it may concern:*

Be it known that I, WILLY SECK, a subject of the German Emperor, and a resident of Aix-la-Chapelle, Germany, have invented a certain new or Improved Friction-Gear for Motor-Cars and the Like, of which the following is a specification.

The object of the present invention is a motor-car with friction-gearing in which the adherent pressure between the friction-disks varies continually according to the force to be transmitted and in which also the lever or pedal acting on the gearing serves at the same time for fixing the movable friction-disk and for applying the brake.

In the accompanying drawings, Figure 1 is a diagrammatic view showing the side elevation of a portion of a vehicle provided with my invention. Fig. 2 is a top plan view of the same with parts omitted for the sake of clearness. Figs. 3, 4, 5, and 6 are details showing the driving mechanism in elevation. Fig. 7 is a plan view of the same.

Figs. 1 and 2 represent the arrangement which allows of the automatic change of pressure of the friction-disk $a$ according to the propelling force of the back wheels $b$, the friction-disk $a$ being pressed with more or less force against the friction-disk $c$, keyed on the main shaft, according to the amount of propelling force. The friction-disk $c$ is driven from the engine in any suitable manner well known in this art.

Figs. 3 to 7 represent the control of the friction-disk by means of the lever (pedal) $d$, which at the same time works the brake of the friction-disk $a$. This disk $a$ is placed upon the axle $d$, on which it can slide along a key. The axle $d$ is arranged in such a way as to be capable of oscillating around the point or axis of oscillation $e$. It can therefore follow the propelling force of the back wheels $b$ by executing an eccentric oscillatory movement, the back axle $f$, which can also oscillate round a point or axis of rotation $q$, being attached to the axle $d$ by rigid rods $h$.

The transmission of force from the axle $d$ to the back axle $f$ is effected in the simplest way by the help of a chain, as shown in the drawings.

In order to change the speed, the friction-disk $a$ is displaced axially on the axle $d$, preferably by the help of a chain. The working of the friction-disk takes place in the following way: $o$, Fig. 7, is a rod movable round its axis and set in the frame parallel to the axle $d$. A guide $n$ can slide longitudinally on this rod $o$, carrying a grooved collar or boss $m$ for the disk $a$.

By means of the chain $r$, attached to the guide $n$ and passing round the two ratchet-wheels $p$ and $q$, the guide $n$, together with the disk $a$, can be displaced axially with the object of varying the ratio between $c$ and $a$. This displacement is effected by the driver turning a hand-wheel (not shown in the drawings) fixed at the upper extremity of the spindle $l$, carrying the chain-wheel $p$.

In order to prevent a spontaneous displacement of the disk $a$, a ratchet-wheel $s$ is fixed to the spindle $l$. The teeth of this ratchet-wheel $s$ are shaped like saw-teeth, and the brake-lever $t$, keyed to the rod $o$, engages them. A spring (omitted from the drawings for the sake of clearness) holds the parts $s$ and $t$ and makes the rod $o$ revolve clockwise.

Besides the brake-lever $t$ the rod $o$ carries at each of its extremities a lever $u$, the object of which is to draw back when the pedal $v$ is put in motion the two plummer blocks or bearings $w$ of the disk-axle $d$, overcoming the propelling force of the back wheels and in this way preventing the possibility of transmission of force by the friction-disks.

The pedal $v$ has a downwardly-projecting piece $x$, which when it is moved far enough tightens the band-brake $y$ of known construction.

The different positions taken by the pedal $v$ are shown in Figs. 3 to 7.

As shown clearly in Fig. 3, the primary object of the pedal is to block the ratchet-wheel $s$, so as to prevent any spontaneous displacement of the disk $a$. In Fig. 4 the pedal is slightly lowered and releases the ratchet-wheel, this being at times necessary when traveling.

In Fig. 5 the pedal is lowered still farther, so that the rods $u$, which are attached to the axle $d$, separate the disks $a$ and $c$, while the band-brake is made to act at the same time. In the position shown in Fig. 6 the pedal is lowered a little farther than in Fig. 4, and this lowering is just enough to release the ratchet $s$ and slightly to separate the disks $a$ and $c$ in order that it may be possible to displace the disks $a$ axially by means of the wheel fixed to $l$.

Having now fully described my invention, what I claim, and desire to secure by Letters Patent, is—

1. In a friction-gear for motor-cars, the combination of a driving-disk, a shaft pivotally mounted adjacent to said disk, a driven disk slidably mounted on said shaft, means for sliding said disk, a pivotally-mounted axle, driving-wheels on said pivotally-mounted axle, rigid connections between said axle and said first-named shaft, and means connecting with said shaft for driving said wheels.

2. In a friction-gear for motor-cars, the combination of a driving-disk, a driven disk, means for reciprocating said driven disk, means for separating said disks and automatically locking said driven disk in adjusted position, comprising a spindle $o$ parallel to the axle of the driven disk, a pedal-lever for rotating said spindle, levers mounted on said spindle, a swinging shaft on which the driven disk is mounted, rods connecting said spindle-levers with said swinging shaft, and a lever $t$, a ratchet-wheel adapted to be engaged by said lever, an operating-shaft on which said ratchet-wheel is rigidly mounted, a sprocket-wheel on said shaft, a second sprocket-wheel mounted adjacent to the spindle $o$, a chain passing around said sprocket-wheels, a guide $n$ slidably mounted on said spindle and engaging with said chain by means of which it may be slid, and a grooved collar on said guide engaging with the disk $a$ and adapted to move the same with said guide, substantially as described.

3. In a friction-gearing for motor-cars, the combination of a pivotally-mounted shaft, a driven gear slidably mounted on said shaft, a spindle mounted parallel to said shaft, means connecting between said shaft and said spindle for swinging said shaft, a pedal-lever secured to said spindle for operating the same, means adjacent to said driven disk for sliding the same, a lever on said spindle for holding said means in adjusted position, and a brake on said shaft adapted to be operated by said spindle, substantially as described.

In testimony whereof I have hereunto set my hand in presence of two witnesses.

WILLY SECK.

Witnesses:
E. M. BRUNDAGE,
HENRY QUADFLUG.